(12) United States Patent
Zawadzki et al.

(10) Patent No.: US 8,177,931 B2
(45) Date of Patent: May 15, 2012

(54) METHOD FOR PERFORATING HEAT MELTABLE MATERIAL

(75) Inventors: Waldemar Zawadzki, Landvetter (SE); Ulf Johannison, Landvetter (SE)

(73) Assignee: Molnlycke Health Care AB, Gothenburg (SE)

( * ) Notice: Subject to any disclaimer, the term of this patent is extended or adjusted under 35 U.S.C. 154(b) by 281 days.

(21) Appl. No.: 12/097,275

(22) PCT Filed: Nov. 8, 2006

(86) PCT No.: PCT/SE2006/050459
§ 371 (c)(1),
(2), (4) Date: Oct. 22, 2008

(87) PCT Pub. No.: WO2007/069990
PCT Pub. Date: Jun. 21, 2007

(65) Prior Publication Data
US 2009/0211693 A1    Aug. 27, 2009

(30) Foreign Application Priority Data
Dec. 16, 2005    (SE) ...................................... 0502791

(51) Int. Cl.
*B32B 37/00* (2006.01)
(52) U.S. Cl. ...... 156/73.3; 156/73.1; 156/247; 156/253; 156/290
(58) Field of Classification Search .............. 156/73.1, 156/73.3, 247, 248, 252, 253, 290, 308.2, 156/308.4, 580.1, 580.2
See application file for complete search history.

(56) References Cited

U.S. PATENT DOCUMENTS

| | | | |
|---|---|---|---|
| 3,671,483 A | 6/1972 | Young | 106/285 |
| 3,800,792 A | 4/1974 | McKnight et al. | 602/50 |
| 3,888,247 A | 6/1975 | Stenvall | 602/59 |
| 4,726,976 A | 2/1988 | Karami et al. | |
| 4,747,895 A | 5/1988 | Wallerstein et al. | |
| 4,781,962 A | 11/1988 | Zamarripa et al. | |
| 4,921,704 A | 5/1990 | Fabo | 424/446 |
| 4,946,853 A | 8/1990 | Bannon et al. | 514/343 |
| 4,991,574 A | 2/1991 | Pocknell | 602/48 |
| 4,995,382 A | 2/1991 | Lang et al. | 602/55 |
| 4,995,930 A | 2/1991 | Merz et al. | |
| 5,322,729 A | 6/1994 | Heeter et al. | 428/306.6 |
| 5,540,922 A | 7/1996 | Fabo | 424/402 |

(Continued)

FOREIGN PATENT DOCUMENTS

AU    2006325538    11/2006

(Continued)

OTHER PUBLICATIONS

Quinn, "The Application of Silicone Gel for Treatment of Hypertrophic Scars and Burn Wounds, and Consideration of the 'Ideal' Burn Dressing," Doctoral Thesis, Bioengineering Unit, University of Strathclyde, Glasgow, Scotland (Apr. 1, 1986).

(Continued)

*Primary Examiner* — James Sells
(74) *Attorney, Agent, or Firm* — Ballard Spahr LLP

(57) ABSTRACT

The present invention relates to a method for making holes in a layer (1) of heat-fusible material. According to the invention a layer of absorbent material (2) is placed in contact with a layer (1) of heat-fusible material, following which the layer of heat-fusible material is heated locally so that holes are formed in the material.

8 Claims, 1 Drawing Sheet

U.S. PATENT DOCUMENTS

| | | | | |
|---|---|---|---|---|
| 5,635,201 | A | 6/1997 | Fabo | 424/443 |
| 5,674,211 | A | 10/1997 | Ekdahl | |
| 5,735,984 | A | 4/1998 | Hoff et al. | |
| 6,395,957 | B1* | 5/2002 | Chen et al. | 604/381 |
| 6,551,436 | B1* | 4/2003 | Flohr et al. | 156/251 |
| 6,911,573 | B2* | 6/2005 | Chen et al. | 604/378 |

FOREIGN PATENT DOCUMENTS

| | | |
|---|---|---|
| BR | PI0619909-7 | 11/2006 |
| CA | 2633169 | 11/2006 |
| CN | 200680047178 | 11/2006 |
| DE | 100 08 827 A1 | 9/2001 |
| EP | 1112823 A2 | 7/2001 |
| EP | 1 528 133 A1 | 5/2005 |
| EP | 06813079 | 11/2006 |
| GB | 713 838 | 8/1954 |
| GB | 830 177 | 3/1960 |
| GB | 1 328 890 A | 9/1973 |
| GB | 1328890 A | 9/1973 |
| GB | 2 313 338 A | 11/1997 |
| IN | 4716/DELP/2008 | 11/2006 |
| JP | 47-040788 Y1 | 12/1972 |
| JP | 61-163198 A | 10/1986 |
| JP | 2001-246597 A | 9/2001 |
| JP | 2008-545541 | 11/2006 |
| KR | 10-2008-7014442 | 11/2006 |
| MX | A/2008/007141 | 11/2006 |
| NO | 20082367 | 11/2006 |
| RU | 2008129085 | 11/2006 |
| SE | 0502791-7 | 11/2006 |
| WO | 96/14191 A1 | 5/1996 |
| WO | PCT/SE2006/050459 | 11/2006 |
| ZA | 2008/05026 | 11/2006 |

OTHER PUBLICATIONS

Perkins, et al., "Silicone Gel: A New Treatment for Burn Scars and Contractures," Burns, 9(3), 201-204 (1982).

Sawada, Y., "Ideas and Innovations: Silicone gel sheet tie-over for skin graft on the eyelid following release of scar contracture," British Journal of Plastic Surgery, vol. 41, pp. 325-326 (1988).

Written Opinion issued by International Searching Authority of WIPO on Jun. 18, 2008 for Intl. App. No. PCT/SE2006/050459, filed on Nov. 8, 2006 (Inventor—Johannison et al.; Applicant—Mölnlycke Health Care AB; pp. 1-7).

International Preliminary Report on Patentabillity issued by International Bureau of WIPO on Jun. 18, 2008 for Intl. App. No. PCT/SE2006/050459, filed on Nov. 8, 2006 (Inventor—Johannison et al.; Applicant—Mölnlycke Health Care AB; pp. 1-7).

Notice of Acceptance issued on Oct. 25, 2011 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1-3).

Response to Examiner's Report filed on Oct. 5, 2011 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1-5).

Examiner's Report issued on Aug. 8, 2011 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1).

Response to Examiner's Report filed on Jul. 27, 2011 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1-6).

Examiner's Report issued on Mar. 7, 2011 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1-2).

Preliminary Amendment filed on Oct. 10, 2008 for AU Pat. App. No. 2006325538, national phase of Intl. App. No. PCT/SE2006/050459 filed on Nov. 8, 2006 (Inventor—Johannison et al.; Applicant—Mölnlycke Health Care AB; pp. 1-2).

Office Action issued on Oct. 28, 2011 for CN Pat. App. No. 200680047178.5, national phase of Intl. App. No. PCT/SE2006/050459 filed on Nov. 8, 2006 (Inventor—Johannison et al.; Applicant—Mölnlycke Health Care AB; pp. 1-6).

Response to Office Action filed on Feb. 22, 2010 for CN Pat. App. No. 200680047178.5, national phase of Intl. App. No. PCT/SE2006/050459 filed on Nov. 8, 2006 (Inventor—Johannison et al.; Applicant—Mölnlycke Health Care Ab; pp. 1-2).

Office Action issued on Oct. 9, 2009 for CN Pat. App. No. 200680047178.5, national phase of Intl. App. No. PCT/SE2006/050459 filed on Nov. 8, 2006 (Inventor—Johannison et al.; Applicant—Mölnlycke Health Care AB; pp. 1-6).

Preliminary Amendment filed on May 22, 2008 for EP Pat. App. No. 06813079.0, national phase of Intl. App. No. PCT/SE2006/050459 filed on Nov. 8, 2006 (Inventor—Johannison et al.; Applicant—Mölnlycke Health Care AB; pp. 1).

Preliminary Amendment filed on or around Jul. 15, 2008 for RU Pat. App. No. 2008129085, national phase of Intl. App. No. PCT/SE2006/050459 filed on Nov. 8, 2006 (Inventor—Johannison et al.; Applicant—Mölnlycke Health Care AB; pp. 1).

Notice of Allowance issued on Nov. 2, 2007 for SE Pat. App. No. 0502791-7, national phase of Intl. App. No. PCT/SE2006/050459 filed on Nov. 8, 2006 (Inventor—Johannison et al.; Applicant—Mölnlycke Health Care AB; pp. 1).

Response to Office Action filed on Jul. 2, 2007 for SE Pat. App. No. 0502791-7, national phase of Intl. App. No. PCT/SE2006/050459 filed on Nov. 8, 2006 (Inventor—Johannison et al.; Applicant—Mölnlycke Health Care AB; pp. 1-2).

Office Action issued on Feb. 28, 2007 for SE Pat. App. No. 0502791-7, national phase of Intl. App. No. PCT/SE2006/050459 filed on Nov. 8, 2006 (Inventor—Johannison et al.; Applicant—Mölnlycke Health Care AB; pp. 1-2).

Response to Office Action filed on Sep. 27, 2006 for SE Pat. App. No. 0502791-7, national phase of Intl. App. No. PCT/SE2006/050459 filed on Nov. 8, 2006 (Inventor—Johannison et al.; Applicant—Mölnlycke Health Care AB; pp. 1-3).

Office Action issued on May 31, 2006 for SE Pat. App. No. 0502791-7, national phase of Intl. App. No. PCT/SE2006/050459 filed on Nov. 8, 2006 (Inventor—Johannison et al.; Applicant—Mölnlycke Health Care AB; pp. 1-3).

Preliminary Amendment filed for ZA Pat. App. No. 2008/05026, national phase of Intl. App. No. PCT/SE2006/050459 filed on Nov. 8, 2006 (Inventor—Johannison et al.; Applicant—Mölnlycke Health Care AB; pp. 1).

Office Action issued on Jan. 17, 2012 for JP Pat. App. No. 2008-545541, national phase of Intl. App. No. PCT/SE2006/050459 filed on Nov. 8, 2006 (Inventor—Johannison et al.; Applicant—Mölnlycke Health Care AB; pp. 1-3).

Extended European Search Report issued on Feb. 24, 2012 for EP Pat. App. No. 06813079.8, national phase of Intl. App. No. PCT/SE2006/050459 filed on Nov. 8, 2006 (Inventor—Johannison et al.; Applicant—Mölnlycke Health Care AB; pp. 1-5).

International Search Report issued by International Searching Authority of WIPO on Feb. 20, 2007 for Intl. App. No. PCT/SE2006/050459, filed on Nov. 8, 2006 (Inventor—Johannison et al.; Applicant—Mölnlycke Health Care AB; pp. 1-5).

* cited by examiner

METHOD FOR PERFORATING HEAT MELTABLE MATERIAL

TECHNICAL FIELD

The present invention relates to a method of making holes in heat-fusible material.

BACKGROUND ART

Layers with patterns of through-holes or perforations form part of many industrial products, such as the layer nearest to the wound surface in wound dressings, for example. A common method of producing the pattern of holes is to punch the holes out. One problem with punching is dealing with the waste, that is to say the parts which in punching are pressed out of the material, and to ensure than none of the waste ends up in the finished product. This problem is accentuated by the fact that the perforating process must be performed rapidly so that the speed of the processing line is not limited by the perforating process.

The object of the present invention is to solve this problem.

DISCLOSURE OF INVENTION

This object is achieved by means of a method for making holes in a layer of heat-fusible material, characterized in that a layer of absorbent material is placed in contact with a layer of heat-fusible material, following which the layer of heat-fusible material is heated locally so that holes are formed in the material.

According to a preferred embodiment the heating is done by means of an ultrasonic device. The layer of absorbent material is preferably removed from the layer of heat-fusible material after having absorbed molten material from the holes made in the layer of heat-fusible material.

In a preferred variant, before the localized heating is generated, one or more layers of material are applied to the layer of heat-fusible material on the opposite side to the side in contact with the absorbent layer. One or more layers of material can also be applied to the absorbent layer on the opposite side to the side in contact with the layer of heat-fusible material, before the localized heating is generated.

BRIEF DESCRIPTION OF DRAWINGS

The invention will now be described with reference to the drawings attached, of which.

MODE(S) FOR CARRYING OUT THE INVENTION

Figure 1:
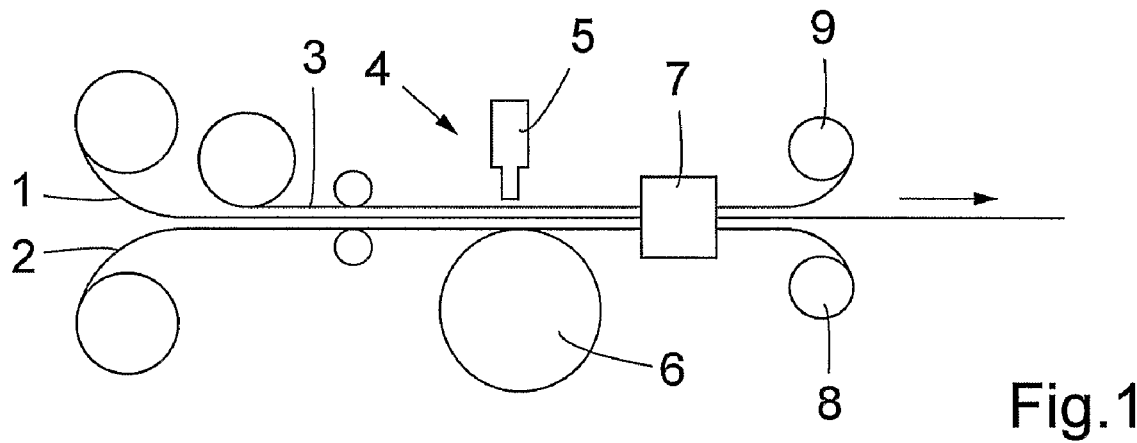
FIG. 1 schematically illustrates an embodiment of the method according to the invention for making holes in heat-fusible material, and FIG. 2 in schematic form shows an absorbent layer partially removed from a perforated layer.

FIG. 1 schematically illustrates a preferred embodiment of the method according to the invention in its simplest form. On a processing line a web 1 of heat-fusible material is unwound from a first storage reel and is brought into contact with a web 2 of absorbent material, which has been unwound from a second storage reel. A second web 3 of absorbent material is then applied on top of the web 1. The united webs 1, 2, 3 then pass through the nip in an ultrasonic device 4, which comprises an ultrasonic horn 5 and a counter-roller 6. The counter-roller 6 is provided with a pattern of protuberances. The energy emitted from the ultrasonic device is adjusted so that as the webs 1, 2, 3 pass through the device a localized melting of the material of the web 1 occurs in the area of each protuberance on the counter-roller, so that a through-hole is formed in the web. The molten material from each hole is absorbed in the layer of absorbent material in the webs 2 and 3. The united web 1, 2, 3 then passes through a cooling device 7 in order to ensure that the material in the hole walls sets. The webs 2 and 3 are then drawn off from the web 1 and wound up onto reels 8 and 9 respectively. The perforated web 1 continues on the processing line for the manufacture of a product comprising a layer of perforated or holed material, such as a bottom layer in a wound dressing, for example.

Since the molten material from each hole is absorbed in the absorbent material in the webs 2 and 3, all waste occurring in the perforating process will be bound in the web 2 of absorbent material. No loose waste will therefore occur.

Figure 2:
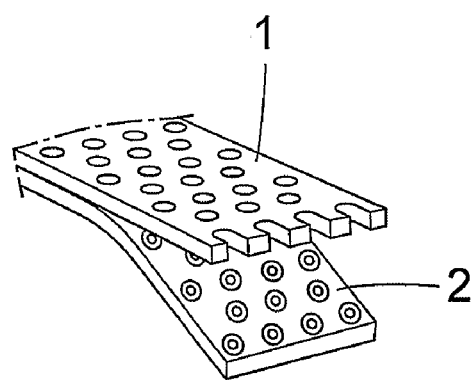

The localized heating generated by the ultrasonic device will also be dissipated to the hole walls so that these soften. Once the united web 1, 2, 3 leaves the ultrasonic device, the material will cool, so that the absorbent material in the webs 2, 3 will be joined to the material in the web 1 in the areas around each hole in the web 1. These joints are broken when the webs 2, 4 are drawn off from the web 1. The webs 2, 3 removed will therefore have a pattern of rings of fusible material corresponding to the pattern of holes in the web 1, as is illustrated schematically in FIG. 2 for the web 2. The mechanical processing of the absorbent layer in the area of each hole bottom furthermore causes the absorbent material to be compressed in these areas, which can lead to the capillaries in the absorbent material becoming smaller and thereby rapidly saturated, so that most of the molten material which disappears from each hole is taken up in the absorbent material in the areas outside the holes.

The web 1 of heat-fusible material may be composed of plastic film, plastic foam, hot-melt or other fusible adhesive. The web 1 may also be composed of non-woven material of thermoplastic fibres or other heat-fusible materials, which for any reason it is desirable to provide with a pattern of holes. The plastic materials used may be polypropylene (PP), polyethylene (PE) or polyurethane (PU), for example.

The webs 2, 3 of absorbent material may be composed of paper, absorbent foam or non-woven material, composed of or containing absorbent fibres. Other absorbent materials may also be used.

The ultrasonic device may be of conventional type, from Dukane, USA or Branson, USA, for example.

The method according to the invention also allows the manufacture of multilayer products having a perforated layer and one or more superimposed or underlying layers. Because a superimposed and/or underlying layer, such as the absorbent layers 2, 3 in the embodiment according to FIG. 1, are joined to the perforated layer in the areas around the holes, it is therefore possible, in performing the method, simultaneously to achieve a perforation of one layer and a lamination of superimposed and/or underlying layers. By selecting plastic material with various melting points, superimposed or underlying layers can be joined together without holes occurring in these materials. It is naturally also possible to make holes in two or more layers. By means of the method it is therefore possible in one and the same operation to produce holes in an adhesive layer and to join a superimposed layer of absorbent foam to the adhesive layer and a superimposed sealing layer of plastic film.

Another example of a product in which the method according to the present invention can be applied is an operating theatre towel for drying up blood and other fluids. In one advantageous embodiment such a towel comprises two folded layers of absorbent non-woven material and an intermediate plastic layer. The method according to the invention allows the intermediate plastic layer to be perforated whilst the two layers of absorbent material are simultaneously joined to the intermediate layer.

In ultrasonic heating the amount of heat emitted will be greatest at the centre of the layer(s) of material situated between the ultrasonic horn and the counter-roller, which is one reason why in the exemplary embodiment described two absorbent layers 2, 3 are preferably used. This is not essential, however. To this end, it is possible to some extent to control the heating of the material layer by using further layers of material, placed over or under the layer(s) to be perforated or joined to a perforated layer, in order to shift the centre.

The embodiments described can naturally be modified without departing from the scope of the invention. For example, other heat sources capable of producing localized heating of the heat-fusible layer can be used for perforation. In such an application it is preferable to use only one absorbent layer applied to the side of the heat-fusible layer remote from the heat source. Through suitable design of the protuberances on the counter-roller, the holes made may be of shapes other than a circular shape, for example oval or rectangular. The invention must therefore be limited only by the content of the patent claims attached.

The invention claimed is:

1. A method for making holes in a layer of heat-fusible material, characterized in that a layer of absorbent material is brought together with the layer of heat-fusible material, following which the layers brought together are fed through a device for localized heating of the heat-fusible material, so that the heat-fusible material melts, forming holes in the heat-fusible material material, wherein the molten heat-fusible material is absorbed into the absorbent material, and the layer of absorbent material is removed from the layer of heat-fusible material after having absorbed molten heat-fusible material from the holes made in the layer of heat-fusible material.

2. The method of claim 1, characterized in that the heating is done by means of an ultrasonic device.

3. The method of claim 1, characterized in that before localized heating of the heat-fusible material, one or more layers of material are applied to the layer of heat-fusible material on an opposite side to the side in contact with the absorbent layer.

4. The method of claim 2, characterized in that before localized heating of the heat-fusible material, one or more layers of material are applied to the layer of heat-fusible material on an opposite side to the side in contact with the absorbent layer.

5. A method for making holes in a layer of heat-fusible material, the method comprising:
   a) bringing together a layer of absorbent material with the layer of heat-fusible material,
   b) feeding the brought-together layers of absorbent and heat-fusible material through a device for localized heating of the heat-fusible material, and heating locally such that the heat-fusible material melts, thereby forming holes in the heat-fusible material, wherein the melted heat-fusible material is absorbed into the absorbent material, and then
   c) removing the layer of absorbent material containing the melted heat-fusible material from the layer of heat-fusible material.

6. The method of claim 5, wherein heating is performed by an ultrasonic device.

7. The method of claim 5, wherein prior to heating, one or more layers of material are applied to the layer of heat-fusible material on an opposite side to the side in contact with the absorbent layer.

8. The method of claim 6, wherein prior to heating, one or more layers of material are applied to the layer of heat-fusible material on an opposite side to the side in contact with the absorbent layer.

* * * * *